No. 651,753. Patented June 12, 1900.
B. C. FOWLKES.
DENTAL COMPOUND.
(Application filed Feb. 24, 1900.)

(No Model.)

Witnesses
C. H. Walker.
Chas. S. Hyer.

Benjamin C. Fowlkes Inventor
By his Attorneys,
C. A. Snow & Co.

UNITED STATES PATENT OFFICE.

BENJAMIN COBB FOWLKES, OF MOBILE, ALABAMA.

DENTAL COMPOUND.

SPECIFICATION forming part of Letters Patent No. 651,753, dated June 12, 1900.

Application filed February 24, 1900. Serial No. 6,375. (No specimens.)

*To all whom it may concern:*

Be it known that I, BENJAMIN COBB FOWLKES, a citizen of the United States, residing at Mobile, in the county of Mobile and State of Alabama, have invented a new and useful Dental Compound, of which the following is a specification.

This invention relates to a dental compound which is termed "vulco aluminium;" and the object of the same is to produce a preparation or combination of ingredients or constituents capable of forming a polished metallic finish to the palatine surface and alveolar ridge of artificial dentures made of vulcanite, commonly known as "rubber plates."

The invention consists in the combination of elements or ingredients hereinafter more fully referred to and in about the proportions stated, though it will be understood that the proportions may be varied at will to accommodate various applications or conditions.

The compound consists of carbon disulfid, two ounces; benzin, one dram; chloroform, one dram; powdered aluminium, one and one-half ounces; rubber, (black dental,) one-eighth of an ounce.

In preparing the compound the rubber is first placed in the carbon disulfid and a period of time permitted to elapse until the rubber shall have become thoroughly dissolved. The chloroform is then added, then the benzin, and finally the powdered aluminium, the whole combination being thoroughly shaken or agitated before using, so as to intermingle the several ingredients.

Figure 1:
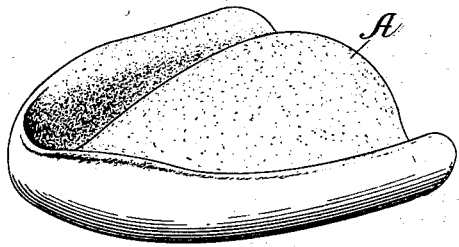
Figure 2:
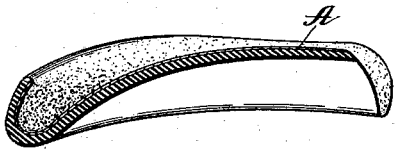

In the accompanying drawings a perspective view of a dental plate is shown by Figure 1, and Fig. 2 illustrates a section through the latter.

After the cast has been prepared for "packing" it is varnished with shellac or any other suitable varnish, and after the said varnish has dried the cast is carefully painted with the compound or vulco aluminium, using a camel's-hair brush for this operation. The cast will then have the appearance indicated by the letter A, as shown in the accompanying drawings, and after the first coat has dried a second coat is immediately applied, and the latter operation is continued until five or six coats have been disposed on the cast, allowing each coat to dry before applying the next, the said drying operation requiring in each instance about three minutes. After the cast is thus finished it is packed in the usual way with rubber.

The advantages of the improved compound are manifold, as it saves time to the dentist by causing the rubber to vulcanize in twenty minutes less time than without using the same. The plaster is more easily removed, and when removed the plates need no polishing, the latter operation usually requiring about fifteen or twenty minutes in its accomplishment. The polished metallic surface that results is particularly agreeable to the soft tissues of the mouth, and the covering of the compound renders the plate non-irritating to the mucous membrane of the oral cavity and prevents what is commonly known as "rubber poison," nearly always found in mouths where a plain rubber plate has been worn any length of time.

The plate treated with the compound is thoroughly aseptic and does not absorb the fluids of the mouth, as does the plain rubber, and, moreover, the plate in this form is more easily cleansed than a gold plate, and additional strength is given the plate, which will obstruct readiness to fracture. The treatment of the plate as set forth will make it perfectly adapt itself to all the rugæ, undercuts of the process, depressions, and minute crevices, which is impossible in the use of a swaged or cast aluminium plate or any other metal denture. Furthermore, the plate thus treated is rendered more durable and beneficial by reason of the fact that the compound is insoluble in either acids or alkalies found in the secretions of the oral cavity or any that could be tolerated in the oral cavity—such, for instance, as are administered in medicines.

Having thus described the invention, what is claimed as new is—

1. A compound for treating dental plates comprising solvent, vehicle and drying constituents, black dental rubber and powdered aluminium.

2. A compound for treating dental plates comprising carbon disulfid, benzin, chloroform, powdered aluminium, and black dental rubber, in or about the proportions stated.

In testimony that I claim the foregoing as my own I have hereto affixed my signature in the presence of two witnesses.

BENJAMIN COBB FOWLKES.

Witnesses:
RIVERS ASHLEY RUSH,
PALMER PELLANS.